Aug. 28, 1945.   R. L. BARBEHENN   2,383,582
MANUFACTURE OF BELL-END PIPES
Filed Dec. 22, 1943
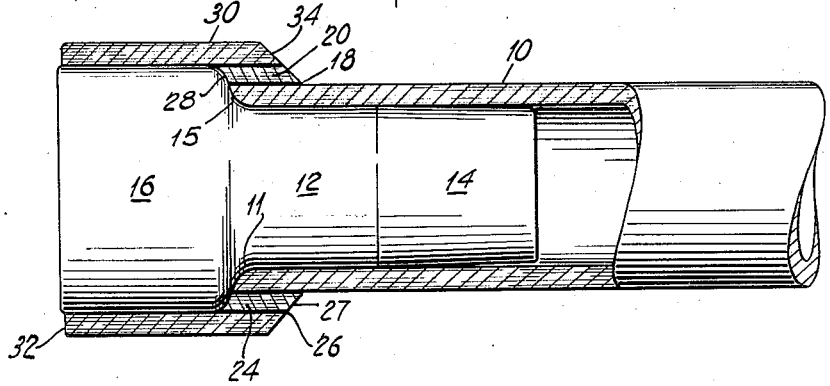
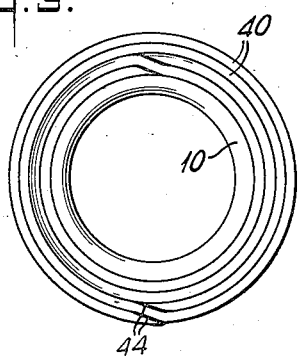
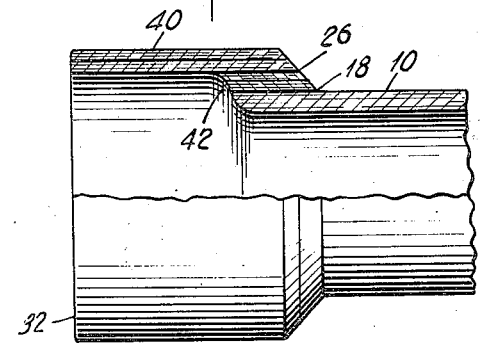
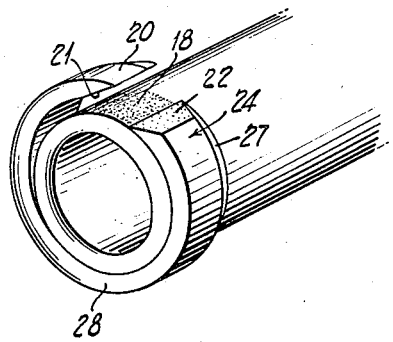
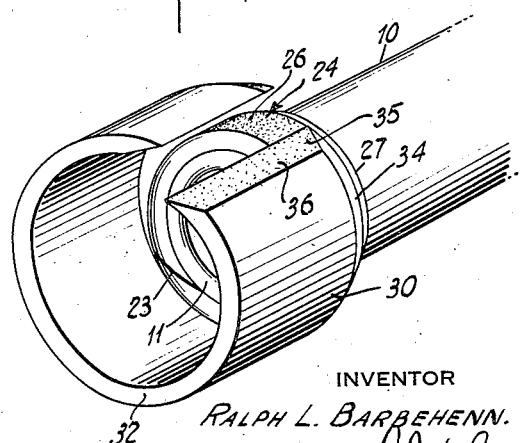
INVENTOR
RALPH L. BARBEHENN.
BY
ATTORNEY Patented Aug. 28, 1945

2,383,582

UNITED STATES PATENT OFFICE 2,383,582

MANUFACTURE OF BELL-END PIPE

Ralph L. Barbehenn, Plainfield, N. J., assignor to Johns-Manville Corporation, New York, N. Y., a corporation of New York Application December 22, 1943, Serial No. 515,281

4 Claims. (Cl. 154—2).

This invention relates to the manufacture of fibro-cementitious pipe, and is particularly directed to a method of manufacturing bell and spigot pipe of hardened, compressed asbestos-cement composition.

Fibro-cementitious pipe, and particularly those of hardened and compressed asbestos-cement composition, have been widely recognized as particularly suitable for use as water pipe and soil pipe. It is possible to manufacture such pipe to weights and dimensions which compare favorably with cast iron, and to impart thereto the necessary structural strength and density for use in the place of cast iron pipe. Asbestos-cement pipe of suitable strength for soil pipe use have not been employed to the extent which their properties warrant chiefly for the reason that it has not heretofore been considered practicable to manufacture such pipe in the conventional bell and spigot form which is generally favored for easy and rapid assembly of soil pipe in end to end relation.

The conventional method of manufacturing asbestos-cement pipe of satisfactory strength involves the steps of forming a thin wet web of asbestos fibers and finely pulverized Portland cement on a machine of the conventional paper mill type, wrapping the web helically upon itself on a forming mandrel to build up a pipe of predetermined wall thickness, and subjecting the green pipe during the winding operation to strong compression to remove excess water and to densify the pipe walls. The green pipe is subsequently removed from the mandrel and cured to develop a cement hardening set. This conventional method does not lend itself practicably to the formation of pipe of bell and spigot form.

A conventional method of coupling straight sections of hardened compressed fibro-cementitious pipe has involved the use of sleeve joints, together with compressible ring gaskets of rubber and/or bituminous sealing material for developing annular leakage and pressure tight joints between the pipe wall and the sleeve. It requires careful finishing and handling of pipe sections which are to be joined by sleeve couplings in order to provide the substantial uniformity of dimension and contour which is necessary for developing satisfactorily strong and leakage-proof couplings. Bell and spigot pipe sections offer certain advantages in comparison with sleeve coupled pipe, for soil pipe use.

A primary object of the present invention is to provide a simple, economical and practical method for manufacturing dense and strong fibro-cementitious bell and spigot pipe. Other objects and advantages will appear from the detailed description that follows.

Preferred embodiments of the invention will be described in connection with the attached drawing, in which:

Fig. 1 is a view in longitudinal section illustrating a preferred method of forming a bell end asbestos-cement pipe employing a shaping plug, in accordance with the present invention;

Fig. 2 is a fragmentary view in longitudinal section illustrating a modified method of forming a bell end asbestos-cement pipe in accordance with the present invention;

Fig. 3 is a view in end elevation showing the bell end of the pipe of Fig. 2;

Fig. 4 is a perspective view illustrating preliminary steps in forming a bell end by building up the outside diameter of a straight uncured pipe section; and Fig. 5 is another perspective view illustrating further steps by which a bell end is formed at the built up end of the pipe of Fig. 4.

In the following description the invention will be explained particularly with reference to the manufacture of bell and spigot pipe of hard and dense asbestos (or other reinforcing fibers) and hydraulic cement composition. The method is simple and readily adapted to the manufacture of both small and large sizes of pipe ranging, for example, from 3-12 inches or larger in diameter and 10-15 ft. in length. The method of forming a bell end is applied at an intermediate stage in the conventional method of forming and curing compressed and hardened fibro-cementitious pipe. In the initial stages straight sections of green uncured pipe are formed by conventional methods. Such methods involve the steps of suspending mixtures of asbestos or other reinforcing fibers and finely-divided Portland cement in a large volume of water, depositing the materials from such suspension or slurry in the form of a web or thin sheet, as on a screen faced cylinder mold, transferring the web to a cloth belt conveyor, again transferring the web from the conveyor to a mandrel, wrapping the web spirally upon itself on the mandrel to form a tubular pipe of predetermined wall thickness, and subjecting the green pipe during the winding operation to strong compression to thereby remove excess water and to compact and densify the material forming the pipe walls. After the pipe has thus been formed by building up a web laminate of asbestos and cement under pressure, the green pipe is removed from the mandrel and cured to develop a cement hardening set.

Within a short period, preferably within a few minutes, after a straight section of green uncured pipe 10 is removed from the mandrel, the outer wall of one end 11 of the pipe is built up to the inside diameter of the bell end in the following manner: A short wooden shaping plug 12 (Fig. 1) is provided having a shank 14 and a head 16. The shank 14 is dimensioned for close fit within an end of pipe 10, and the head of the plug is dimensioned and contoured to correspond to the inside profile of the bell end to be formed. The shank 14 is inserted into end 11 of the green pipe 10, and curved base 15 of the plug head is forced into tightly abutting relation with end 11 of the pipe. With the plug in the position which is illustrated, a coating film 18 of cement or silica-cement slurry is applied to the outer circumference of the pipe wall adjacent to base 15 of the plug head (Figs. 1 and 4). A narrow strip 20 of green pipe stock freshly cut from a previously formed green pipe section having a wall thickness sufficient to provide suitable clearance between the pipe and the bell, is then wrapped tightly around the coated circumference of the pipe end 11. Strip 20 is preferably of the same thickness as the bell, and is cut with a width approximating ¼ the diameter of the pipe 10, and with a length which equals the inner circumference of the bell (3.1416×the outer diameter of the pipe 10, plus double the thickness of the strip). The ends 21 of the strip 20 are preferably chamfered or feathered, and just prior to or during the wrapping operation a thin film 22 of cement slurry is applied to the strip ends. At the completion of the wrapping operation, the ends of strips 20 are connected together in a scarf joint to form a longitudinal seam 23. For the purpose of supplying a strip 20 of suitable strength and thickness, a straight green pipe of dimensions and composition which may correspond to those of pipe 10, is formed substantially simultaneously with the formation of pipe 10, and such strip may then be cut either longitudinally or circumferentially from such green pipe.

After strip 20 has been wrapped and cemented in tightly fitting relation to form a collar 24 (Fig. 5) around the end 11 of the pipe, a second slurry film 26 of cement, or cement and silica, is applied over the outer exposed surface of the collar 24. To form a bell end sleeve, a second wider strip 30 of green uncured pipe stock is then wrapped in overlapping relation around the head of forming plug 12 and the exposed outer surface of the collar 24, with a side edge 32 of strip 30 extending forwardly of the end 11 of the pipe to form the wall of the bell end for the pipe. A rearward side edge 34 of strip 30 should overlap strip 20, and edge 34 of strip 30, and the adjacent rearward side edges 27 of strip 20, are preferably chamfered or feathered to form smooth circumferential seams about the outer wall of pipe 10. Strip 30 is cut from green pipe stock preferably having a thickness corresponding to the desired wall thickness of the bell end. The width of strip 30 usually approximates ½–1½ times the internal diameter of the pipe 10, and in any case is not less than the desired length of the bell end plus the approximate width of strip 20. In length strip 30 is cut to the outer circumferential dimensions of the bell end; and its ends 35 are preferably feathered and coated with cement slurry 36 whereby to form a longitudinal scarf joint seam.. Smooth contours may be provided for the inner walls of the joint between the end 11 of the pipe and the bell by feathering edges 11 of the pipe and 28 of strip 20 to closely correspond to the contour of the curved section of the plug, and by filling up any apertures between the plug surface and the pipe and strip edges with cement slurry. Smooth and uniform outer contours may be formed by chamfering and cementing the rearward edges of strips 30 and 20 in the manner illustrated in Fig. 1.

After the longitudinal and circumferential seams of the bell end have been formed and sealed with cement slurry the shaping plug 12 is loosened and removed from its position within the pipe end and bell after the lapse of a period of about 5 minutes. The thus-molded green bell end pipe section is then cured to develop a permanent hardening set of the cement. When the binder component of the pipe stock consists of Portland cement or equivalent hydraulic cement, the hardening set may be developed by long exposure to normal atmospheres over a period which may last several weeks. The preferred binder composition both for the pipe stock and for the cement slurry, consists of about 0.6 part of finely-divided silica for every one part of Portland cement. Bell end pipes incorporating finely-divided silica in their composition should be cured to develop a hardening set by heating them in an autoclave in an atmosphere of saturated steam under a pressure of approximately 100 lbs. per square inch. This steam curing operation is rapid, and may normally be completed within a period not to exceed 24 hours. After completing the steam curing operation any residual moisture may be rapidly removed from the pipes by heating in a drying oven, if desired.

One of the advantages of forming a bell end for a straight pipe section by wrapping a strip of green pipe stock around the head of a wooden plug having the dimensions and inner profile of the bell, is that by this method it is possible to rapidly form non-pervious and tightly fitting circumferential joints between the base of the bell and adjacent pipe end. During the wrapping operation the strip of green stock is forced into close fitting engagement with the periphery of the forming plug and the built up section of the pipe end, and any apertures which might otherwise develop adjacent the curved surfaces of the forming plug are filled up with cement slurry. When the bell end is formed by a single wrap of a green pipe stock strip having a thickness corresponding to the desired thickness of the bell, such strip should be cut accurately to the circumferential dimensions of the bell, and its opposite ends should be chamfered to provide a scarf joint seam having the necessary strength for withstanding high hydrostatic pressure. A straight section of asbestos-cement pipe of 4" diameter for soil pipe use, when made by this method, normally exhibits an ultimate bursting strength averaging about 150 lbs. per square inch. Bell end asbestos-cement pipe of 4" diameter made by this single wrap method, having exhibited under test an average bursting strength of about 106 lbs. per square inch.

Even stronger bell end pipe sections can be made by a modification of the above described method, according to which the bell end is formed by double wrapping around the head of the forming plug and a built up end or collar 42 of pipe 10, a strip 40 having half the thickness of a desired bell end (Figs. 2 and 3). Both ends and the rearward side edge of this strip are chamfered, and are sealed with cement slurry to the overlapped sections of the bell and collar 42 to provide neat and strong lap joints 44 and circumferential seam 26. One bell-ended pipe of 4" diameter made by this double wrapping method exhibited an ultimate bursting strength of 175 lbs. per square inch, and withstood a hydrostatic head of 30 ft. over a 48 hour period without any leakage.

During the operation of building up straight sections of green pipe on a forming mandrel under pressure in the manner heretofore described, and of subsequently loosening the formed pipe from the mandrel, there is a tendency to develop slight softening and stretching of the pipe stock immediately adjacent its ends. According to the present invention, this feature of the straight pipe stock is taken advantage of at the time of inserting the forming plug into the pipe end, by forcing the head of the plug sharply against the end of the green pipe to thereby shape the soft end 11 of the pipe to conform to the curved base 15 of the plug head. Neat and smooth curvatures of the inner and outer profiles of the bell end at the joint between the bell end and the pipe may be further insured by chamfering the side edges of the wrapping strip 20 to conform to the desired curvature of the bell, and by filling any apertures and joints with cement slurry.

One of the principal advantages of the process herein described is that it is practical for forming bell ends for pipe sections which are oval, or out of round in cross section. Conventional methods of manufacturing fibro-cementitious pipe frequently produce pipe ends of unsymmetrical cross section, which has been one of the principal difficulties in the way of developing a suitable and practical bell and spigot pipe. By the process of the present invention, any such dimensional or contour irregularities in the pipe end are adjusted during the operation of shaping the pipe and bell to the profile dimensions of the forming plug.

The proportions of asbestos and cement which are used in the manufacture of pipe may vary over a considerable range. Suitable proportions include a range of 15–40 parts by weight of asbestos fibers and 60–85 parts by weight of Portland cement. To develop additional strength in the product, finely-divided silica may be incorporated in the mixture in the proportions of 30–100 parts to 100 parts of Portland cement. When the product incorporates silica in its composition, the cement is preferably cured by contact with saturated steam in an autoclave under a superatmospheric pressure of 70–120 lbs. gauge per square inch. During this operation the lime and other basic ingredients of the Portland cement react with the silica and water to form hydrous monosilicates.

Relatively long and harsh reinforcing fibers are preferred, such as harsh chrysotile or amosite asbestos fibers. Such harsh fibers may be blended with less harsh chrysotile asbestos The preferred fiber length classification by the Quebec Standard Screen Test is one in which 12 ounces of a 16 ounce sample are retained on a 4 mesh screen, 3 ounces retained on a 10 mesh screen and 1 ounce passed through a 10 mesh screen.

For the production of a product of suitable tensile and bursting strength, it is necessary to employ high pressures on the mandrel during the formation of the pipe section 10 and the wrapping strips 20 and 30. In manufacturing a pipe section of 8 inch inside diameter and 13 foot length, for example, the initial pressure during the early stages of the web winding operation may total about 22 tons. Such pressure is applied by a bottom press roll of 25 inches diameter and two upper press rolls of 7½ inches diameter. The maximum pressure is preferably decreased by at least about 10–15% during the winding operation as the wall thickness of the green pipe builds up.

Bell and spigot pipe sections which are manufactured by the process exhibit substantial tensile and bursting strength. For example, a 4 inch bell end pipe such as portrayed in Fig. 1 having a wall thickness of about 0.35" and after being finally cured, exhibited a bursting strength of 130 lbs. per square inch and was leakage proof under a hydrostatic head of 30 feet. Such strength was determined by standard test methods and represents ultimate strength prior to failure. Failure usually takes place at the joint between the bell end and the straight pipe section, or in the longitudinal seam of the bell.

Since many variations may be made from the illustrative details given, without departing from the scope of the invention, it is intended that the invention should be limited only by the terms of the claims interpreted as broadly as consistent with novelty over the prior art.

What I claim is:

1. The method of manufacturing a bell end pipe of hardened compressed fiber-cement composition which comprises, forming straight sections of green uncured pipe of predetermined wall thickness, building up the outside diameter of one end of a freshly formed green pipe section to the inside diameter of a bell end by applying a coating of cement slurry to the outer periphery of said pipe end and wrapping a narrow strip cut from green pipe stock tightly around the coated end of the pipe, forming a bell end extension of the built up pipe end by applying an aqueous cement slurry coating to the exposed outer surface of the strip wrapping, wrapping a second strip cut from green pipe stock and having a width substantially equal to the width of the first strip plus the length of the bell about the first strip, with its rearward edge overlapping the rearward edge of the first strip and with its forward edge extending forwardly of the pipe end to form the bell, chamfering and splicing the ends of the wrapping strips with cement slurry to form longitudinal scarf joint seams, and curing the bell end pipe sections thus formed.

2. The method of manufacturing bell end pipe which comprises, utilizing a shaping plug having a head and shank dimensioned and contoured respectively to match inner contours of the bell end pipe, inserting the plug shank into one end of a freshly formed green straight pipe section of highly compressed fiber-cement composition, forcing the head of the plug into tightly abutting contact with the pipe end, building up the outside diameter of the said pipe end to the inside diameter of the bell by wrapping a narrow strip cut from green pipe stock around the end of the pipe section adjacent the plug head, chamfering and splicing the ends of said strip with cement slurry to form a longitudinal scarf joint seam, applying a thin coating of aqueous cement-silica slurry to the exposed outer surface of the built up pipe end, forming a bell end extension of the built up pipe end by wrapping a wider strip cut from green pipe stock in overlapping relation tightly about the cement coated first strip, with the forward edge of the second strip extending forwardly of the pipe end to form the bell, chamfering and splicing the ends of the second strip with a cement slurry to form a longitudinal scarf joint bell seam, loosening and removing the plug from the bell end thus formed, and curing the bell end pipe section.

3. The method of manufacturing a bell end pipe of hardened compressed fiber-cement composition as defined in claim 2, including the step of circumferentially spacing the longitudinal splicing seams of the narrow and wider wrapping strips.

4. The method of manufacturing a bell end pipe of hardened compressed asbestos-cement composition while employing a shaping plug having a head and shank dimensioned respectively to the inner contours of the bell end pipe, which comprises, forming green pipe stock by wrapping a thin wet web of asbestos and hydraulic cement composition spirally upon itself upon a mandrel, highly compressing the web during the winding operation while building up a straight pipe section of suitable wall thickness, and removing a straight green pipe section thus formed from the mandrel, inserting the shank of the shaping plug forcibly into an end of a green pipe section thus formed, applying a thin cement slurry coating to the outer periphery of the said green pipe end, building up the outside diameter of the thus-coated end of the pipe to the inside diameter of a bell end by wrapping a narrow strip cut from green pipe stock tightly around the cement coated end, chamfering the ends of the strip and splicing the ends with cement slurry to form smooth longitudinal seams, applying a thin coating of cement slurry to the exposed outer surface of the built up collar thus formed, forming a bell end by wrapping a wider strip of green pipe stock about the head of the shaping plug and in overlapping relation about the built up end collar, chamfering and splicing the ends of said wider strip with cement slurry to form longitudinal bell seams, loosening and removing the plug from the bell end thus formed, and curing the bell end pipe to develop a permanent hardening set.

RALPH L. BARBEHENN.